United States Patent
Makita et al.

[11] Patent Number: 5,510,141
[45] Date of Patent: Apr. 23, 1996

[54] COATING COMPOSITION AND METHOD FOR FORMING THIN FILM ON SUBSTRATE USING SAME

[75] Inventors: Kensuke Makita; Yasuo Moriguchi; Junichi Okuda, all of Matsusaka, Japan

[73] Assignee: Central Glass Company, Limited, Ube, Japan

[21] Appl. No.: 378,729

[22] Filed: Jan. 26, 1995

[51] Int. Cl.[6] .................................................. B05D 5/06
[52] U.S. Cl. ..................... 427/165; 427/356; 427/380; 427/428
[58] Field of Search .............................. 427/372.2, 380, 427/165, 356, 428

[56] References Cited

U.S. PATENT DOCUMENTS 4,759,949   7/1988   Pavlik et al. .................. 427/178 X

FOREIGN PATENT DOCUMENTS 5-57225   9/1993   Japan .

Primary Examiner—Michael Lusignan
Attorney, Agent, or Firm—Jacobson, Price, Holman & Stern

[57] ABSTRACT

The invention relates to a method for applying a coating composition to a substrate with a reverse roller coater so as to form a thin film on the substrate and then for baking the thin film so as to transform the thin film into a metal oxide film. The coating composition comprises: 0.1–10 wt % of at least one organic metal compound on a metal oxide basis; and at least one organic solvent. The at least one organic metal compound is selected from the group consisting of metal alkoxides, metal acetyl-acetonates and metallic soaps. The coating composition is adjusted to have a viscosity within a range from 0.1 to 100 centipoises. In this method, a reverse roller of the coater is rotated at a rotation speed within a range from 2 to 55 m/min. and the substrate is moved at a moving speed within a range from 1 to 30 m/min. while the coating composition is applied to the substrate. Furthermore, the rotation speed of the reverse roller is adjusted to be higher than the moving speed of the substrate. According to the invention, it is possible to form an optical metal oxide film which has a uniform thickness of up to about 10 μm (more particularly up to about 1 μm).

6 Claims, 1 Drawing Sheet

FIGURE
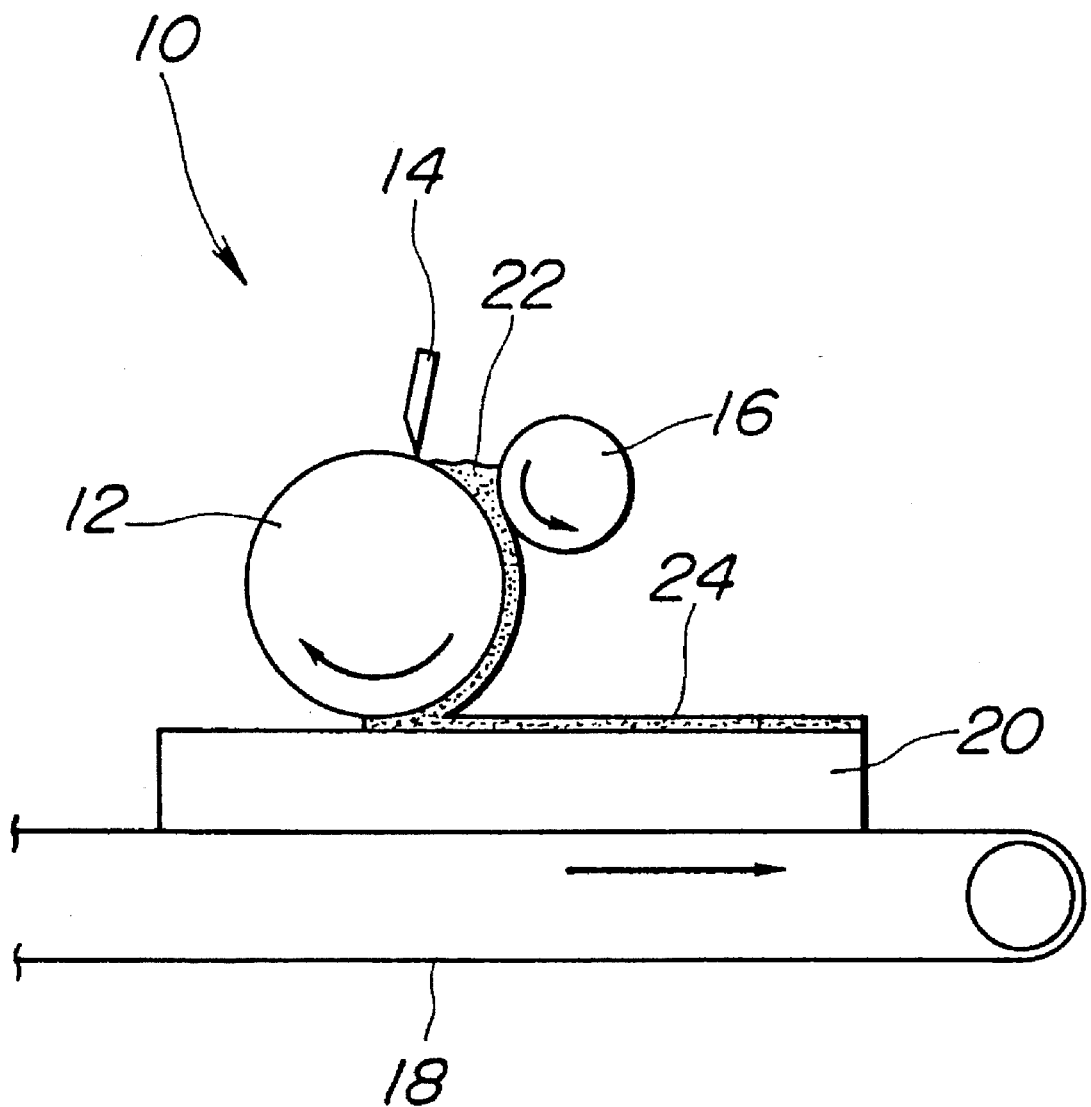

COATING COMPOSITION AND METHOD FOR FORMING THIN FILM ON SUBSTRATE USING SAME

BACKGROUND OF THE INVENTION

The present invention relates to a coating composition and a method for forming a metal oxide thin film on a substrate using the coating composition. The film-forming method belongs to the sol-gel process. In this method, a coating composition (sol) is applied to a substrate with a reverse roller coater so as to form a thin film on the substrate, and then the thin film is baked so as to transform the thin film into an optical film (metal oxide film).

There are various proposed methods for applying a coating composition to a substrate, as follows. In a dipping method, a substrate is dipped into a coating composition and then the substrate is withdrawn therefrom at a certain speed. In a flow coating method, a coating composition is flowed over a substrate. In a direct roller coating method, a coating composition is applied to a rotating plastic roller, and then this wet roller is rolled on a substrate in a direction which is the same as the moving direction of the substrate while the substrate is moved below the roller. In a spin coating, a coating composition is dropped to a substrate and the dropped coating composition is spread on the substrate by rotating the substrate.

According to dipping and spin coating methods, the thickness of the thin film can be very precisely controlled. Thus, these methods are generally used in case that the thickness of the thin film is to be controlled, for example, on the submicron order. However, in case of a dipping method, both major surfaces of a substrate are normally coated with a thin film. Therefore, when only one major surface of a substrate is to be coated with a thin film, it is necessary to cover the other major surface with a masking tape or the like before the coating. In case of a spin coating method, it is possible to coat only one major surface of a substrate with a thin film having a well-controlled thickness. However, as a substrate is enlarged in size, it is necessary to prepare a larger device for holding and rotating the substrate. In case that a large-size substrate is used, it is necessary to very firmly attach the substrate to the rotating device for safety.

According to flow and direct roller coating methods, one major surface of a substrate is very easily coated with a thin film. However, in case of a flow coating method, a coating composition is flowed so as to make a curtain thereof above the substrate while the substrate is moved. This curtain has a certain width so as to cover the width of the substrate. Thus, as the substrate is enlarged in width, it is necessary to lengthen the curtain's width. With this, it is necessary to circulate a large amount of coating composition for reusing the same which has not been applied to the substrate. Thus, the solute concentration of the coating composition and its viscosity may increase in time. In case of a direct roller coating method, it may be difficult to adjust the contact degree between a roller and a substrate. Thus, as the substrate is enlarged in size, the thickness of thin film formed on the substrate may become uneven from portion to portion thereof. Therefore, this method may be inappropriate for allowing an optical thin film to have a thickness deviation of from −10% to +10% from the objective thickness. Furthermore, this method may be inappropriate for controlling the film thickness on the submicron order.

Furthermore, there is known a reverse roller coating method for applying a coating composition to a substrate. In this method, a reverse roller is rotated in a direction reverse to a moving direction of the substrate while the substrate is moved in the moving direction below the reverse roller. According to a conventional reverse roller coating method, it is possible to allow a thin film to have a uniform thickness of, for example, at least about 10 µm. However, according to this method, it is difficult to allow an optical thin film to have a thickness of, for example, up to 1 µm.

JP-A-5-57225 discloses a so-called squeeze type coating method with a roller coater. This coater has a pair or rollers 2 each having a rubber covering 2b. The rubber covering 2b is formed thereon with a groove 2c which is spiral about an longitudinal axis of the roller 2. While a coating liquid 14 is applied to a steel plate 1 by the roller coater, a shaped metal member 3 having an edge portion which conforms to the spiral groove 2c in shape is pressed against the roller 2 so as to uniformly abrade the spiral groove 2c. However, this method may not be suitable for forming an optical thin film on a substrate.

Thus, there is an increasing demand for a method of forming on a substrate an optical thin film which has a thickness of up to about 10 µm (more particularly up to about 1 µm) and a thickness deviation of from −10% to +10% from the objective thickness, without having the above-drawbacks.

SUMMARY OF THE INVENTION

It is therefore an object of the present invention to provide a coating composition which enables an optical thin film formed on a substrate to have a thickness of up to about 10 µm (more particularly up to about 1 µm) and a thickness deviation of from −10% to +10% from the objective thickness.

It is another object of the present invention to provide a method for forming the optical thin film using a reverse roller coater.

According to a first aspect of the present invention, there is provided a coating composition for forming a thin film on a substrate by a reverse roller coating method and then baking the thin film, the coating composition comprising:

0.1–10 wt % of at least one organic metal compound on a metal oxide basis, said at least one organic metal compound being selected from the group consisting of metal alkoxides, metal acetylacetonates and metallic soaps; and at least one organic solvent, wherein the coating composition has a viscosity which is in a range from 0.1 to 100 centipoises.

According to a second aspect of the present invention, there is provided a method for applying a coating composition to a substrate with a reverse roller coater so as to form a thin film on the substrate and then for baking the thin film so as to transform the thin film into a metal oxide film, the method being characterized in that the coating composition of the first aspect of the present invention is used.

It has been generally thought that it is difficult to form an optical thin film on a substrate by a conventional reverse roller coating method. However, we have unexpectedly found that an optical thin film having a substantially uniform thickness can be formed on a substrate by using a special coating composition of the present invention in a reverse roller coating method. Furthermore, we have unexpectedly found that a rotation speed of a reverse roller and a moving speed of a substrate which are specified in relation to each other in accordance with the present invention are preferable for obtaining such optical thin film. Still furthermore, we have unexpectedly found that a thin film formed on a substrate can be baked at a temperature which is the same as that of a heat bending process or a tempering process of a substrate. Thus, according to the present invention, the thickness of an optical thin film can be well controlled, as is the same as or better than that according to a conventional dipping method. In fact, according to the present invention, the optical thin film has a thickness of up to about 10 μm (more particularly up to about 1 μm) and a thickness deviation of from −10% to +10% from the objective thickness. Furthermore, this optical thin film is superior in adhesion to a substrate, abrasion resistance and durability. According to the invention, an excessive coating composition can be circulated and reused and the film forming rate is sufficiently high, as compared with conventional methods. According to the invention, various functional thin films such as an ultraviolet shielding film, a reflection reducing film, an infrared reflection film, a sub-layer film of some passivation films and a combiner of a head up display system can be produced with a high efficiency and a high quality.

BRIEF DESCRIPTION OF THE DRAWINGS

FIGURE is a schematic side view showing a condition in which a coating composition according to the present invention is applied to a substrate with a reverse roller coater.

DESCRIPTION OF THE PREFERRED EMBODIMENTS

A coating composition according to the present invention comprises: 0.1–10 wt % of at least one organic metal compound on an oxide basis; and at least one organic solvent. This at least one organic metal compound is selected from the group consisting of metal alkoxides, metal acetylacetonates and metallic soaps. The coating composition is adjusted to have a viscosity which is in a range from 0.1 to 100 centipoises (cP). The thus prepared coating composition is stable during storage. Commercially available raw materials may be chosen for preparing the coating composition. The coating composition enables an optical thin film formed on a substrate to be superior in abrasion resistance, durability, optical characteristics and the like.

A metal alkoxide of the present invention may be either a simple alkoxide having no organic group other than alkoxyl group, such as a methoxide, an ethoxide, an isopropoxide or the like, or an alkyl alkoxide having at least one alkyl group besides alkoxyl group, such as monomethylalkoxide, a monoethylalkoxide or the like. This metal alkoxide may partially have halogen substituents such as chlorine. A metal acetylacetonate of the present invention may be either a simple acetylacetonate having no organic group other than acetylacetone group, or an acetylalkoxyacetonate such as methylalkoxyacetonate or ethylalkoxyacetonate.

Metal types of the metal alkoxides and the metal acetylacetonates are not particularly limited. However, it is preferable to use Si, Ti, Zr, Sn, In and the like. Thus, examples of the metal alkoxides and the metal acetylacetonates are tetramethoxysilane, tetraethoxysilane, methyltriethoxysilane, methyltrimethoxysilane, titanium tetraisopropoxide, titanium acetylacetonate, zirconium n-butoxide, zirconium acetylacetonate, dimethyldiethoxysilane, dimethyldimethoxysilane, titanium tetra-n-butoxide, zirconium tetraisopropoxide, zirconium tetraoctylate, tin tetra-n-butoxide and indium tetra-n-butoxide.

It is preferable that the at least one organic metal compound is selected from the group consisting of first, second and third members. The first member is up to three metal alkoxides having at least one metal selected from the group consisting of Si, Ti, Zr and Sn. The second member is a mixture of at least one indium alkoxide and at least one tin alkoxide. The third member is a metallic soap which is a zinc salt.

The at least one organic solvent of the present invention is not limited to particular types. Preferable examples of the at least one organic solvent are: alcohols or polyvalent alcohol derivatives such as methanol, ethanol, isopropanol, n-buthanol, isobuthanol, ethoxyethanol, methoxypropanol, n-amyl alcohol, isoamyl alcohol, benzyl alcohol, ethylene glycol, ethylene glycol monomethyl ether and ethylene glycol monoethyl ether; esters such as methyl acetate, ethyl acetate, n-propyl acetate, isopropyl acetate, n-butyl acetate, isobutyl acetate, benzyl acetate, ethyl acetoacetate and dibutyl phthalate; ketones such as acetone, methyl ethyl ketone, diethyl ketone, acetylacetone, isophorone; aromatic hydrocarbons such as benzene, toluene and xylene; and halogenated hydrocarbons such as tetrachloroethylene, trichloroethane, methylene chloride, chloroform and carbon tetrachloride.

In the invention, the coating composition may further comprise a metal carboxylate, an inorganic metal compound such as metal nitrate, metal oxychloride or metal chloride, and/or a sol in which metal oxide fine particles are dispersed.

As is described hereinabove, the coating composition comprises 0.1–10 wt % of the at least one organic metal compound on an oxide basis. The organic metal compound concentration is preferably from about 0.5 to about 7 wt %. If it is less than 0.1 wt %, it may be necessary to reduce the moving speed of a substrate and the rotation speed of a reverse roller for obtaining a thin film having a desired thickness. With this, the thickness of the thin film tends to become uneven. Furthermore, it may be difficult to obtain a practical thin film having a thickness of from 10 nm to the monomolecular layer thickness. It it exceeds 10 wt %, a thin film after the baking tends to have cracks and to become insufficient in strength and uneven in thickness. In fact, its thickness deviation from the objective thickness tends to be out of a range of from −10% to +10%.

As is described hereinabove, the coating composition is adjusted to have a viscosity which is in a range from 0.1 to 100 cP. With this, it becomes possible to make the film thickness uniform. If it is higher than 100 cP, it becomes difficult to uniformly apply the coating composition to the reverse roller coater. With this, the film thickness tends to become uneven. The viscosity is preferably in a range from about 1 to about 20 cP.

With reference to FIGURE, a method for forming an optical (metal oxide) thin film on a substrate using the above coating composition will be described in the following in accordance with the present invention. The film-forming method belongs to the sol-gel process. In this method, the coating composition (sol) is applied to a substrate with a reverse roller coater so as to form a thin film on the substrate, and then this thin film is baked so as to transform the thin film into an optical (metal oxide) thin film.

As is seen from FIGURE, designated by numeral 10 is a reverse roller coater. The coater 10 comprises a reverse roller 12, a doctor blade 14, a doctor roller 16 and a carrier belt 18. A glass substrate 20 is moved by the carrier belt 18 during the application of the coating composition 22 to the substrate 20 such that the substrate 20 passes below the reverse roller 12. It is an important feature of the coater 10 that the reverse roller 12 is rotated during the application in a direction reverse to the moving direction of the substrate 20, as illustrated. In other words, the reverse roller 12 is rotated in a direction as if the substrate 20 were moved by the reverse roller 12 in a direction reverse to the actual moving direction of the substrate 20. The doctor blade 14 serves to scrape the remaining coating composition off the reverse roller 12. The doctor roller 16 serves to regulate the amount of the coating composition 22 to be applied to the reverse roller 12. It should be noted that the reverse roller 12 and the doctor roller 16 are specifically positioned relative to each other and the reverse roller 12 and the substrate 20 are also specifically positioned relative to each other for the purpose of obtaining a thin film 24 having a desired thickness.

In the invention, it is preferable that the rotation speed of the reverse roller 12 is adjusted within a range from 2 to 55 m/min. If it is less than 2 m/min., the coating composition tends to flow on the reverse roller and to be somewhat dried on the reverse roller. If it is greater than 55 m/min., the coating composition tends to be scattered from the reverse roller in the form of small drops and the coater operation tends to become complicated. Furthermore, in the invention, it is preferable that the moving speed of the substrate is adjusted within a range from 1 to 30 m/min. Still furthermore, in the invention, it is preferable that the rotation speed of the reverse roller is adjusted to be higher than the moving speed of the substrate for shortening a time from the application of the coating composition to the reverse roller until the application of the coating composition to the substrate. This is effective for not making the coating composition dry before the application to the substrate.

In the invention, the thin film formed on the substrate is baked, for example, in a heat bending process and/or in an air quenching process of the substrate. The baking temperature is preferably from 500° to 700° C.

The glass substrate may be colorless or colored as long as it is transparent. It may be made of organic glass as long as it is flat in shape upon the reverse roller coating. It may become a curved glass, a tempered glass, a multiple glass or a laminated glass, after the baking.

In the invention, it is optional to form a multilayer thin film on a substrate. In this case, for example, the following method may be taken. At first, the coating composition is applied to the substrate with the reverse roller coater so as to form a first thin film on the substrate. Then, the first thin film is dried at a temperature not higher than 400° C. Then, the coating composition is applied to the first thin film with the reverse roller coater so as to form a second thin film on the first thin film. Then, the second thin film is dried at a temperature not higher than 400° C. If further thin film(s) is to be formed, the same processes as those of the first and second thin films are taken. Then, the formed thin films are baked at a temperature not lower than 400° C. so as to transform the thin films to metal oxide films.

In the invention, it is optional that the excessive coating composition which has not been applied to the substrate is recovered and reused in the reverse roller coating method. In this case, it is preferable to prepare another coating composition containing the at least one organic solvent and the at least one organic metal compound of which concentration is lower than that (0.1–10 wt %) of the original coating composition according to the present invention. This another coating composition may be added at a certain rate to the recovered coating composition so as to form a mixture, and then this mixture may be applied to another substrate with the reverse roller coater.

The following examples are illustrative of the present invention, but these examples are not limitative.

EXAMPLE 1

In this example, a coating composition was applied to a substrate with a reverse roller coater so as to form a thin film on the substrate, and then the thin film was baked so as to transform the thin film into an optical (metal oxide) thin film, as follows.

As is shown in FIGURE, a reverse roller coater 10 having a reverse roller 12, a doctor blade 14, a doctor roller 16 and a carrier belt 18 was used. The reverse roller 12 was made of ethylene-propylene terpolymer (EPDM). Each of the doctor blade 14 and the doctor roller 16 was formed at its surface with a Cr-plated or stainless steel mesh (180 lines/in., depth: 45 μm). Although not shown in FIGURE, the coater 10 was equipped with a device for respectively adjusting the rotation speeds of the reverse roller 12 and the carrier belt 18, a device for adjusting relative positions of the reverse roller 12 and the doctor roller 16, and a device for supplying and circulating a coating composition.

A silica sol obtained by hydrolyzing tetraethoxysilane (the organic metal compound) was mixed with an alcohol mixture prepared by mixing ethanol and isopropyl alcohol in a volume ratio of 9:1 such that the thus formed coating composition (sol) had about 1.8 wt % of the organic metal compound on a metal oxide basis and a viscosity within a range from 2 to 4 cP. Separately, a float glass plate having a thickness of about 3 mm was well washed and dried.

The coating composition was suitably applied to this glass plate with the reverse roller coater, while the reverse roller 12 was rotated at a rotation speed of about 6 m/min., the glass plate 20 was moved at a constant speed of about 3.5 m/min. and a gap between the reverse roller 12 and the top surface of the carrier belt 18 was adjusted to about 2.95 mm which is about 0.05 mm less than the thickness of the glass plate 20. With this, a thin film 24 was formed on the glass plate 20. After the formation, the glass plate 20 was allowed to stand still for about 1 min. Then, the glass plate was horizontally baked in an electric furnace at a temperature of about 500° C. for about 10 min. The baked thin film was a $SiO_2$ thin film. A plurality of points of this baked film were measured with an ellipsometer. With this, it was found that the $SiO_2$ thin film had a refractive index of about 1.45, an average thickness of about 105 nm and a standard deviation of thickness of about 5 nm. Thus, it was found that the $SiO_2$ thin film was substantially uniform in thickness.

EXAMPLE 2

In this example, Example 1 was repeated except the following points. A silica sol of Example 1 was mixed with a solvent mixture prepared by mixing isopropyl alcohol and an acetate in a volume ratio of about 10:1 such that the thus formed coating composition (sol) had about 6 wt % of the organic metal compound on a metal oxide basis and a viscosity within a range from 3 to 5 cP. The coating composition was suitably applied to the glass plate with the reverse roller coater, while the reverse roller was rotated at a speed of about 35 m/min., the glass plate was moved at a speed of about 10 m/min.

A plurality of points of the baked thin film ($SiO_2$ thin film) were measured with an ellipsometer. With this, it was found that the $SiO_2$ thin film had a refractive index of about 1.45, an average thickness of about 200 nm and a standard deviation of thickness of about 9 nm. Thus, it was found that the $SiO_2$ thin film was substantially uniform in thickness.

EXAMPLE 3

In this example, Example 1 was repeated except the following points. A sol obtained by hydrolyzing a titanium alkoxide was diluted with a solvent mixture prepared by mixing isopropyl alcohol and ethyl cellosolve in a volume ratio of 1:1 such that the thus formed coating composition (sol) had about 5.5 wt % of the organic metal compound on a metal oxide basis and a viscosity within a range from 2 to 6 cP. The coating composition was suitably applied to a float glass plate having a thickness of about 2 mm with the reverse roller coater, while the reverse roller was rotated at a speed of about 18 m/min., the glass plate was moved at a speed of about 10 m/min. and a gap between the reverse roller and the top surface of the carrier belt was adjusted to about 1.95 mm. Then, the glass plate after the application was put on a SiC plate and then baked in an electric furnace of about 650° C. for about 5 min.

A plurality of points of the baked thin film ($TiO_2$ thin film) were measured with an ellipsometer. With this, it was found that the $TiO_2$ thin film had a refractive index of about 2.20, an average thickness of about 150 nm and a standard deviation of thickness of about 9 nm. Thus, it was found that the $TiO_2$ thin film was substantially uniform in thickness.

EXAMPLE 4

In this example, Example 2 was repeated except the following points. Zinc diethylcaproate, linoleic acid and xylene were mixed together such that the thus prepared coating composition had about 4.5 wt % of the organic metal compound on a metal oxide basis and a viscosity within a range from 5 to 10 cP. The glass plate immediately after the application of the coating composition thereto was put into an electric furnace of about 550° C. The baking was conducted for about 30 min. while the combustion gas was continuously removed from the furnace. The thus baked thin film was partially etched with a concentrated hydrochloric acid. Then, the film thickness was measured with a profilometer (a tracer-arm type device for measuring the film thickness). With this, it was found that the film thickness was about 700 nm. This thin film was ZnO film. Its spectral transmittance was examined. In this examination, the ZnO thin film showed an ultraviolet shielding effect. In fact, this film did not transmit ultraviolet rays having wavelengths of not longer than about 370 nm at all.

EXAMPLE 5

A first sol obtained by hydrolyzing tetraethoxysilane (a first organic metal compound) and a second sol obtained by hydrolyzing titanium tetraisopropoxide (a second organic metal compound) were mixed together so as to adjust the molar ratio of the first organic metal compound to the second organic metal compound to 60:40 on a metal oxide basis. This sol mixture was diluted with isopropyl alcohol such that the thus prepared first coating composition had 3.0 wt % of the total of the organic metal compounds on a metal oxide basis and a viscosity within a range from 2 to 6 cP.

Separately, a float glass plate having a thickness of about 2 mm, a length of about 1,600 mm and a width of about 900 mm was sufficiently washed and then dried. The first coating composition was applied to this float glass plate by a reverse roller coating method under the same conditions as those of Example 2 so as to form a first thin film on the glass plate. After the application, the glass plate was dried at a temperature of about 250° C. for about 30 min.

Then, this coated glass plate was washed with water and then dried. Separately, a third sol obtained by hydrolyzing tetraethoxysilane was diluted with ethanol such that the thus prepared second coating composition had 2.5 wt % of the organic metal compound on a metal oxide basis and a viscosity within a range from 2 to 6 cP. Then, the second coating composition was applied to the coated glass plate by the reverse roller coater while the reverse roller was rotated at a speed of about 30 m/min. and the glass plate was moved at a speed of about 10 m/min. so as to form a second thin film on the first thin film. After the application, the glass plate was dried at a temperature of about 250° C. for about 30 min.

Then, the thus coated glass plate was suitably cut for the purpose of the use as an automotive front windshield. This coated glass plate was piled on another uncoated glass plate having the same shape as that of the coated glass plate in a manner to expose the coated surface of the glass plate. Then, the piled glass plates were baked in a furnace of about 650° C. for about 15 min. so as to bend the glass plates. Then, the glass plates were separated from each other. Then, each glass plate was washed and then dried. Then, the glass plates were put together with an interposal therebetween of a polyvinyl butyral interlayer film having a thickness of about 0.8 mm. Then, the interlayer film was allowed to adhere to the glass plates in an autoclave of about 130° C. and about 10 atm. so as to prepare a laminated glass plate.

This laminated glass plate was cut, and then optical measurements were conducted thereon with an ellipsometer. With this, it was found that the first thin film of $TiO_2$ and $SiO_2$ had a refractive index of about 1.75 and a thickness of about 100 nm and that the second thin film of $SiO_2$ had a refractive index of about 1.45 and a thickness of about 120 nm. It was found that the laminated glass plate functions as a reflectance reducing glass plate. In fact, the laminated glass plate reduced the visible light reflectance by about 5% with respect to an incident light of about 65°.

What is claimed is:

1. A method for applying a coating composition to a substrate with a reverse roller coater so as to form a thin film on the substrate and then for baking the thin film so as to transform the thin film into a metal oxide film, the method being characterized in that the coating composition comprises:

0.1–10 wt % of at least one organic metal compound on a metal oxide basis, said at least one organic metal compound being selected from the group consisting of metal alkoxides, metal acetylacetonates and metallic soaps; and at least one organic solvent, wherein said coating composition has a viscosity which is in a range from 0.1 to 100 centipoises; wherein a reverse roller of the coater is rotated at a rotation speed within a range from 2 to 55 m/min. and the substrate is moved at a moving speed within a range from 1 to 30 m/min. while the coating composition is applied to the substrate, and wherein the rotation speed of the reverse roller is adjusted to be higher than the moving speed of the substrate.

2. The method according to claim 1 wherein the coating composition comprises at least one organic metal compound containing at least one metal which is selected from the group consisting of Si, Ti, Zr, Sn and In.

3. The method according to claim 1 wherein the coating composition comprises at least one organic metal compound selected from the group consisting of first, second and third members, the first member being up to three metal alkoxides having at least one metal selected from the group consisting of Si, Ti, Zr and Sn, the second member being a mixture of at least one indium alkoxide and at least one tin alkoxide, the third member being a metallic soap which is a zinc salt.

4. A method according to claim 1, wherein the thin film is baked at a temperature within a range from 500° to 700° C.

5. A method according to claim 1, wherein the coating composition which has not been applied to the substrate is recovered, then another coating composition is added at a certain rate to the recovered coating composition so as to form a mixture, and then the mixture is applied to another substrate with the reverse roller coater, the another coating composition comprising the at least one organic solvent and the at least one organic metal compound of which concentration is lower than that of the coating composition of claim 1.

6. A method for applying a coating composition to a substrate with a reverse roller coater so as to form a thin film on the substrate and then for baking the thin film so as to transform the thin film into a metal oxide film, the method being characterized in that the coating composition comprises:

0.1–10 wt % of at least one organic metal compound on a metal oxide basis, said at least one organic metal compound being selected from the group consisting of metal alkoxides, metal acetylacetonates and metallic soaps; and at least one organic solvent, wherein said coating composition has a viscosity which is in a range from 0.1 to 100 centipoises; wherein the method comprises the sequential steps of:
  (a) applying the coating composition to the substrate with the reverse roller coater so as to form a first thin film on the substrate:
  (b) drying the first thin film at a temperature not higher than 400° C.;
  (c) applying the coating composition to the first thin film with the reverse roller coater so as to form a second thin film on the first thin film;
  (d) drying the second thin film at a temperature not higher than 400° C.; and
  (e) baking the first and second thin films at a temperature not lower than 400° C. so as to respectively transform the first and second thin films to first and second metal oxide films.

* * * * *